US012681536B2

(12) United States Patent
Kishimoto et al.

(10) Patent No.:     US 12,681,536 B2
(45) Date of Patent:         Jul. 14, 2026

(54) DISPLAY DEVICE

(71) Applicant: Samsung Display Co., Ltd., Yongin-si (KR)

(72) Inventors: Hirotsugu Kishimoto, Yongin-si (KR); Yong-Kwan Kim, Yongin-si (KR); Hyunjae Na, Yongin-si (KR); Sungguk An, Yongin-si (KR); Seokwon Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 376 days.

(21) Appl. No.: 18/456,184

(22) Filed: Aug. 25, 2023

(65) Prior Publication Data

US 2024/0152183 A1     May 9, 2024

(30) Foreign Application Priority Data

Nov. 7, 2022   (KR) ........................ 10-2022-0147257

(51) Int. Cl.
   *G06F 1/16*          (2006.01)
   *H04M 1/02*          (2006.01)

(52) U.S. Cl.
   CPC .......... *G06F 1/1643* (2013.01); *G06F 1/1616* (2013.01); *G06F 1/1656* (2013.01); *H04M 1/0216* (2013.01); *H04M 1/0268* (2013.01)

(58) Field of Classification Search
   CPC .... G06F 1/1643; G06F 1/1616; G06F 1/1656; G06F 1/1637; G06F 1/1641; G06F 2203/04102; G06F 1/1652; G06F 3/041; G06F 3/0412; H04M 1/0216; H04M 1/0268; B32B 1/00; B32B 3/266; B32B 2457/20

See application file for complete search history.

(56) References Cited

U.S. PATENT DOCUMENTS

| | | | | |
|---|---|---|---|---|
| 11,500,506 | B2 | 11/2022 | Kishimoto et al. | |
| 11,762,419 | B2 * | 9/2023 | Lee ........................ | G06F 1/1652 |
| | | | | 361/679.01 |
| 2020/0209998 | A1 * | 7/2020 | Shin ...................... | G06F 1/1641 |
| 2021/0173437 | A1 * | 6/2021 | Bae ........................ | G06F 1/1616 |

(Continued)

FOREIGN PATENT DOCUMENTS

| | | | | |
|---|---|---|---|---|
| EP | 4141611 A1 * | 3/2023 | ........... | G06F 1/1652 |
| KR | 10-2021-0142039 A | 11/2021 | | |
| KR | 10-2021-0150942 A | 12/2021 | | |

*Primary Examiner* — Dmitriy Bolotin
(74) *Attorney, Agent, or Firm* — Womble Bond Dickinson (US) LLP

(57) ABSTRACT

A display device includes: a display module having a first non-folding region, a folding region foldable with respect to a folding axis, and a second non-folding region sequentially arranged along a first direction; a lower plate under the display module and having a plurality of plate openings overlapping the folding region; and a digitizer film under the lower plate and having a first region overlapping the first non-folding region and a portion of the folding region, a second region overlapping the folding region, and a third region overlapping a portion of the folding region and the second non-folding region. The digitizer film has a plurality of holes passing therethrough in the second region and includes a plurality of coils not overlapping the second region.

17 Claims, 10 Drawing Sheets

(56) References Cited

U.S. PATENT DOCUMENTS

| | | | |
|---|---|---|---|
| 2021/0341970 A1* | 11/2021 | Lee | G06F 1/1681 |
| 2022/0044599 A1* | 2/2022 | La | G06F 1/1641 |
| 2022/0086267 A1* | 3/2022 | Shin | H04M 1/0268 |
| 2022/0183174 A1* | 6/2022 | Bae | G06F 1/1641 |
| 2022/0397934 A1* | 12/2022 | La | G06F 3/046 |
| 2023/0030438 A1* | 2/2023 | Kim | G06F 1/1643 |
| 2023/0289021 A1* | 9/2023 | Jeon | G06F 3/046 |

* cited by examiner

FIG. 3

DISPLAY DEVICE

CROSS-REFERENCE TO RELATED APPLICATION

This application claims priority to and the benefit of Korean Patent Application No. 10-2022-0147257, filed on Nov. 7, 2022, in the Korean Intellectual Property Office, the entire content of which is incorporated by reference herein.

BACKGROUND

1. Field

Aspects of embodiments of the present disclosure relate to a display device.

2. Description of Related Art

Display devices provide information to users by displaying various images on one or more display screens. Generally, a display device displays information within the given screen. Recently, flexible display devices including flexible display panels capable of being folded are being developed. A flexible display device, different from a rigid display device, is foldable, rollable, or bendable. A flexible display device capable of shape change in various ways may be more easily carried regardless of the screen size, thereby enhancing user convenience.

A digitizer of a display device may include various sensing coils to be activated in response to electrical signals. The sensing coils are activated at a region in response to signals applied from the outside.

SUMMARY

Embodiments of the present disclosure provide a display device including a digitizer exhibiting improved folding reliability.

A display device, according to an embodiment of the present disclosure, includes: a display module having a first non-folding region, a folding region foldable with respect to a folding axis, and a second non-folding region sequentially arranged along a first direction; a lower plate under the display module and having a plurality of plate openings overlapping the folding region; and a digitizer film under the lower plate and having a first region overlapping the first non-folding region and a portion of the folding region, a second region overlapping the folding region, and a third region overlapping a portion of the folding region and the second non-folding region. The digitizer film has a plurality of holes passing therethrough in the second region and includes a plurality of coils not overlapping the second region.

The plurality of coils may include: a plurality of first coils in the first region and extending along the first direction; a plurality of second coils in the first region and extending along a second direction crossing the first direction; a plurality of third coils in the third region and extending along the first direction; and a plurality of fourth coils in the third region and extending along the second direction. The plurality of first coils and the plurality of second coils may be electrically separated from the plurality of third coils and the plurality of fourth coils.

The digitizer film may further include: a base layer having an upper surface and a lower surface facing the upper surface; a first conductive layer including a part of the plurality of coils on the upper surface of the base layer; and a second conductive layer including the remaining part of the plurality of coils on the lower surface of the base layer. The first conductive layer and the second conductive layer may not overlap the second region.

The digitizer film may further include a first adhesive layer on the upper surface of the base layer and covering the first conductive layer. The first adhesive layer may cover the part of the plurality of coils.

The digitizer film may further include a second adhesive layer on the lower surface of the base layer and covering the second conductive layer. The second adhesive layer may cover the remaining part of the plurality of coils.

The digitizer film may further include a first cover layer attached to the first adhesive layer and a second cover layer attached to the second adhesive layer. The plurality of holes may pass through the first cover layer, the first adhesive layer, the base layer, the second adhesive layer, and the second cover layer.

The second region may have a width smaller than that of the folding region.

The width of the second region may be in a range of 0.5 mm to 4 mm.

The plurality of holes may extend along a second direction crossing the first direction, the plurality of holes may include a first hole group and a second hole group spaced apart from each other in the first direction, and the first hole group and the second hole group may be arranged in a staggered manner.

A distance between the first hole group and the second hole group may be in a range of 50 $\mu$m to 300 $\mu$m in a non-folding state.

A length of each of the plurality of holes in the second direction may be in a range of 10 mm to 50 mm in a non-folding state.

A width of each of the plurality of holes in the first direction may be in a range of 20 $\mu$m to 300 $\mu$m in a non-folding state.

The display device may further include an adhesive layer between the lower plate and the digitizer film and overlapping the first non-folding region and the second non-folding region. The adhesive layer may not overlap the folding region to expose the plurality of plate openings.

The folding region may have a width in a range of 5 mm to 50 mm.

A display device, according to another embodiment of the present disclosure, includes: a display module having a first non-folding region, a folding region foldable with respect to a folding axis, and a second non-folding region sequentially arranged along a first direction; a lower plate under the display module and having plate openings overlapping the folding region defined therein; and a digitizer film under the lower plate and having a first region overlapping the first non-folding region and a portion of the folding region, a second region overlapping the folding region, and a third region overlapping a portion of the folding region and the second non-folding region. The digitizer film has a plurality of holes passing therethrough in the second region, and the second region of the digitizer film has a width smaller than that of the folding region.

The digitizer film may include: a plurality of first coils in the first region and extending along the first direction; a plurality of second coils in the first region and extending along a second direction crossing the first direction; a plurality of third coils in the third region and extending along the first direction; and a plurality of fourth coils in the third region and extending along the second direction. The plurality of first coils and the plurality of second coils may be electrically separated from the plurality of third coils and the plurality of fourth coils.

The plurality of holes may extend along a second direction crossing the first direction, the plurality of holes may include a first hole group and a second hole group spaced apart from each other in the first direction, and the first hole group and the second hole group may be arranged in a staggered manner.

A distance between the first hole group and the second hole group may be in a range of 50 $\mu$m to 300 $\mu$m in a non-folding state.

A width of each of the plurality of holes in the first direction may be in a range of 20 $\mu$m to 300 $\mu$m in a non-folding state.

A length of each of the plurality of holes in the second direction may be in a range of 10 mm to 50 mm in a non-folding state.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and, together with the description, explain aspects and features of the present disclosure. In the drawings:

FIG. 3 is a cross-sectional view of a display device according to an embodiment of the present disclosure;

DETAILED DESCRIPTION

Figure 1A:
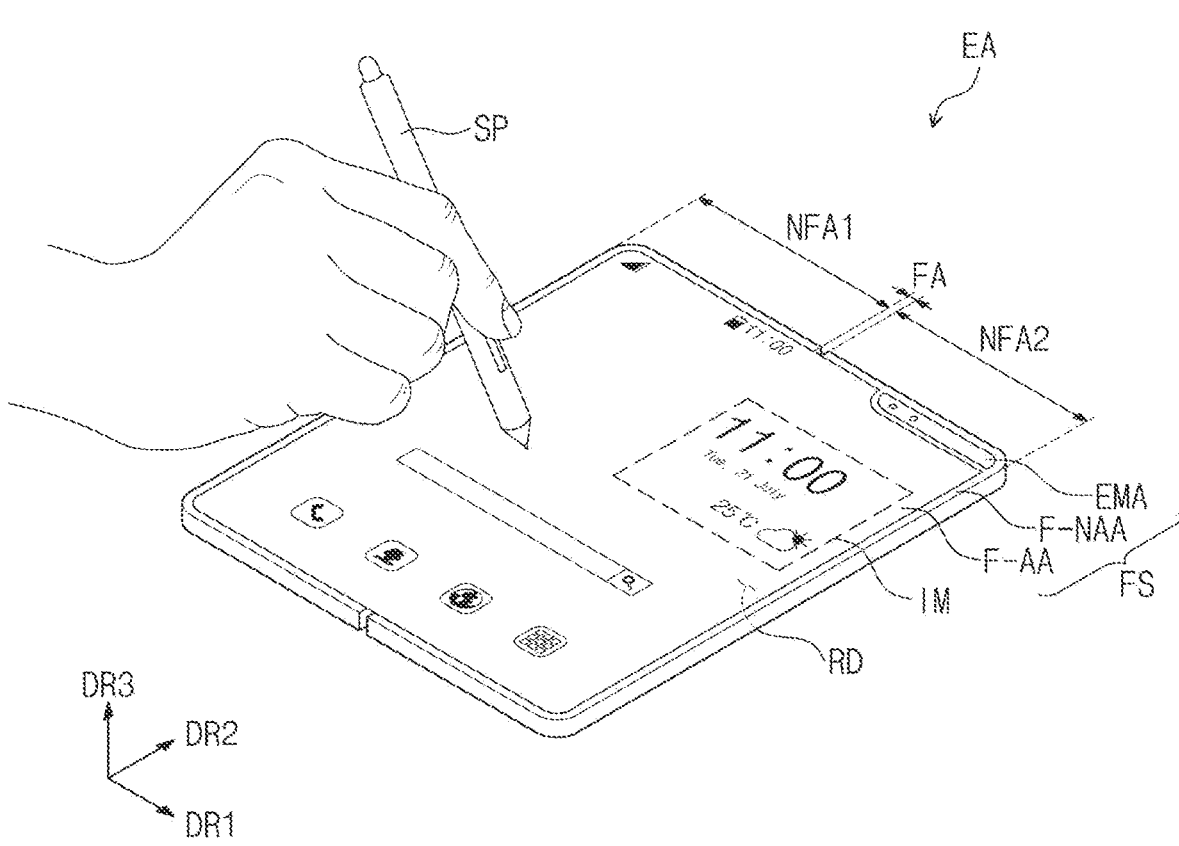
FIG. 1A is a perspective view of a display device according to an embodiment of the present disclosure in an unfolded state.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to the accompanying drawings.

FIG. 1A is a perspective view illustrating a display device EA according to an embodiment of the present disclosure in an unfolded state.

Referring to FIG. 1A, the display device EA may be activated in response to electrical signals. The display device EA may include various embodiments. For example, the display device EA may include (or may represent) a tablet computer, a laptop computer, a computer, a smart television, and the like. A smartphone is illustrated as the display device EA merely as an example, and the present disclosure is not limited thereto.

The display device EA may display an image IM in a third direction DR3 on (or from) a first display surface FS parallel to each of a first direction DR1 and a second direction DR2. The first display surface FS on which the image IM is displayed may correspond to a front surface of the display device EA. The image IM may include not only a dynamic image but also a still image. In FIG. 1A, the image IM includes an internet search window, a clock window, and a plurality of apps as an example.

According to an embodiment of the present disclosure, an upper surface (or a front surface) and a lower surface (or a rear surface) of each component of the display device EA are defined with respect to a direction in which the image IM is displayed. In other words, the front surface and the rear surface may be opposed to each other in the third direction DR3, and the normal direction of each of the front surface and the rear surface may be parallel to the third direction DR3.

A distance between the front surface and the rear surface in the third direction DR3 may correspond to the thickness/height of the display device EA in the third direction DR3. The directions indicated by the first through third directions DR1, DR2, and DR3 may be relative concepts and, thus, may be changed to other directions.

The display device EA may detect an external input applied thereto. The external input may include various types of inputs provided from the outside of the display device EA. For example, the external input may include not only a touch by a body part, such as a user's hand, but also an external input applied to the display device EA or applied adjacent thereto at a distance (e.g., hovering above the display device EA). The external input may have various types, such as force, pressure, temperature, light, and the like.

FIG. 1A illustrates that the external input is provided by a user's pen SP as an example. The pen SP may be attachable/detachable to/from the inside or outside of the display device EA, and the display device EA may provide and receive signals corresponding to the attachment and the detachment of the pen SP.

The display device EA may have a first display surface FS and a second display surface RD. The first display surface FS may include a first active region F-AA, a first peripheral region F-NAA, and an electronic module region EMA. The second display surface RD may be defined as a surface opposed to at least a portion of the first display surface FS.

The first active region F-AA may be activated in response to electrical signals. The first active region F-AA may be a region at where the image IM is displayed and an input by the pen SP is detectable.

The first peripheral region F-NAA may be adjacent to the first active region F-AA. The first peripheral region F-NAA may have a color (e.g., a predetermined color). The first peripheral region F-NAA may surround (e.g., may surround in a plan view or extend around a periphery of) the first active region F-AA. Accordingly, the shape of the first active region F-AA may be defined substantially by the first peripheral region F-NAA. However, this is an example, and the first peripheral region F-NAA may be disposed adjacent only to one side of the first active region F-AA or may be omitted altogether.

The electronic module region EMA may have various electronic modules disposed therein. For example, the electronic module may include at least one of a camera, a speaker, a light detection sensor, or a heat detection sensor. The electronic module region EMA may detect external objects received through the display surfaces FS and RD or may provide sound signals, such as a voice, to the outside through the display surfaces FS and RD. The electronic module may include a plurality of components but is not limited to any one embodiment of the present disclosure.

The electronic module region EMA may be surrounded by the first peripheral region F-NAA. However, this is an example, and an embodiment of the present disclosure is not limited thereto. For example, the electronic module region EMA may be surrounded by the first active region F-AA and the first peripheral region F-NAA, and the electronic module region EMA may be disposed in the first active region F-AA.

The display device EA, according to an embodiment of the present disclosure, may have at least one folding region FA and a plurality of non-folding regions NFA1 and NFA2 extending from the folding region FA. For example, a first non-folding region NFA1, the folding region FA, and a second non-folding region NFA2 may be defined (or arranged) along the first direction DR1. For example, the first non-folding region NFA1 may extend from the folding region FA along the opposite direction of the first direction DR1, and the second non-folding region NFA2 may extend from the folding region FA along the first direction DR1.

The folding region FA may be referred to as a foldable region, and the first and second non-folding regions NFA1 and NFA2 may be referred to as non-foldable regions. The folding region FA may be adjacent to (e.g., may be between) the first non-folding region NFA1 and the second non-folding region NFA2 and may be foldable with respect to a folding axis AX1 or AX2 (see, e.g., FIG. 1B or FIG. 1D).

Figure 1B:
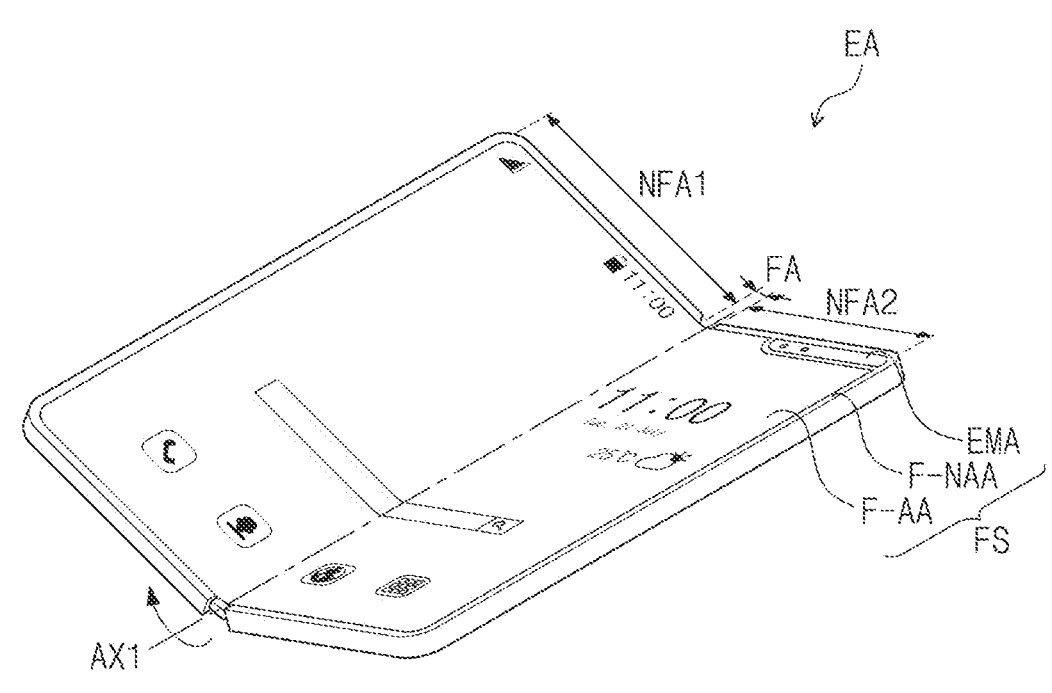
FIG. 1B is a perspective view of the display device shown in FIG. 1A illustrating a folding operation thereof according to an embodiment of the present disclosure.
Figure 1B:
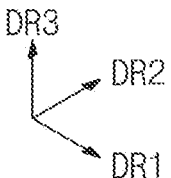

FIG. 1B is a perspective view of the display device EA illustrating a folding operation thereof according to an embodiment of the present disclosure.

Referring to FIG. 1B, the display device EA according to an embodiment may be foldable with respect to a first folding axis AX1 extending in the second direction DR2. The folding region FA may have a curvature (e.g., a predetermined curvature) and a curvature radius (e.g., a predetermined curvature radius) when the display device EA is in a folded state. The display device EA may be folded with respect to the first folding axis AX1 to be in an in-folded state such that the first non-folding region NFA1 and the second non-folding region NFA2 face each other, and the first display surface FS is not exposed to the outside.

Figure 1C:
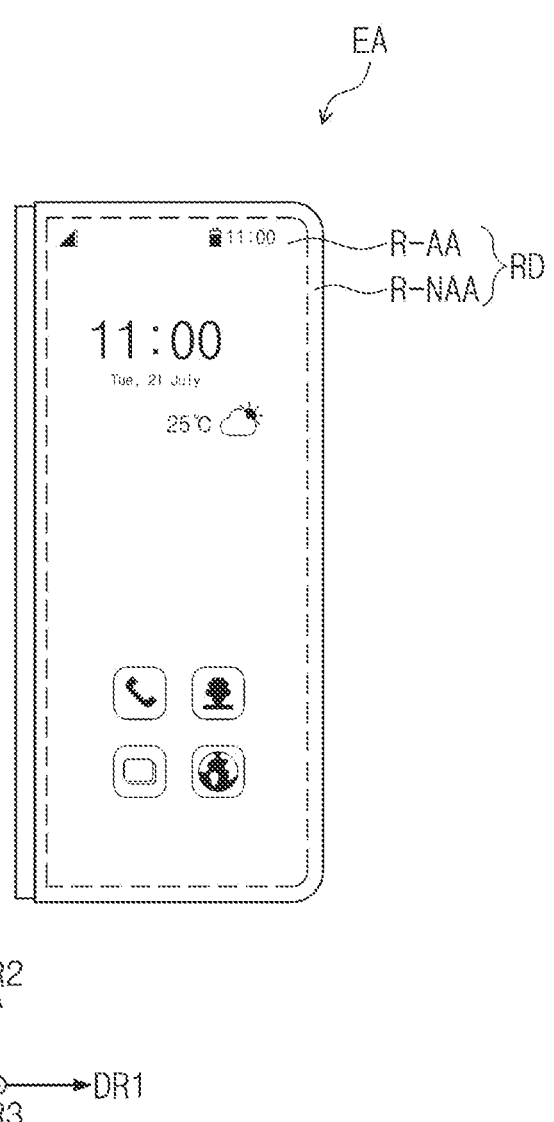
FIG. 1C is a plan view of the display device shown in FIG. 1A in a folded state according to an embodiment of the present disclosure.

FIG. 1C is a plan view of the display device EA in a folded state according to an embodiment of the present disclosure.

Referring to FIG. 1C, when the display device EA according to an embodiment is in an in-folded state, the second display surface RD may be viewable by a user. At this time, the second display surface RD may include a second active region R-AA at where an image is displayed. The second active region R-AA may be activated in response to electrical signals. The second active region R-AA may be a region at where an image is displayed and various types of external inputs are detectable.

A second peripheral region R-NAA may be adjacent to the second active region R-AA. The second peripheral region R-NAA may have a color (e.g., a predetermined color). The second peripheral region R-NAA may surround the second active region R-AA. In addition, the second display surface RD may further include an electronic module region at where an electronic module having various components is disposed, but an embodiment of the present disclosure is not limited thereto.

Figure 1D:
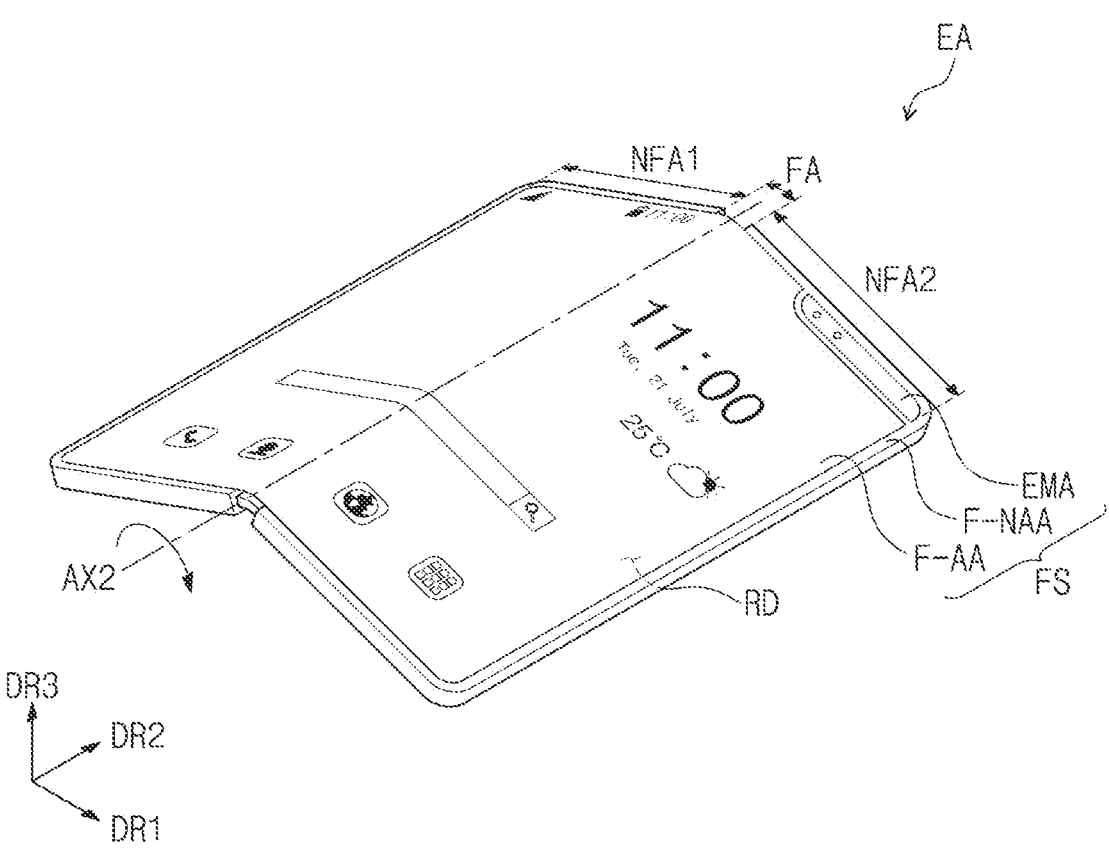
FIG. 1D is a perspective view of the display device shown in FIG. 1A illustrating a folding operation thereof according to an embodiment of the present disclosure.

FIG. 1D is a perspective view of the display device EA illustrating a folding operation thereof according to an embodiment of the present disclosure.

Referring to FIG. 1D, the display device EA, according to an embodiment of the present disclosure, may be foldable with respect to a second folding axis AX2 extending in a second direction DR2. The display device EA may be folded with respect to the second folding axis AX2 to be in an out-folded state such that the first display surface FS is exposed to the outside. The display device EA, according to an embodiment of the present disclosure, may be configured to repeat an in-folding or out-folding operation and an unfolded operation, and vice versa, but an embodiment of the present disclosure is not limited thereto.

FIGS. 1A through 1D illustrate that the display device EA is folded with respect to one folding axis AX1 or AX2 as examples, but the number of folding axes and the corresponding number of non-folding regions are not limited thereto. For example, the display device EA may be folded with respect to a plurality of folding axes such that a portion of the first display surface FS faces a portion of the second display surface RS.

Figure 2:
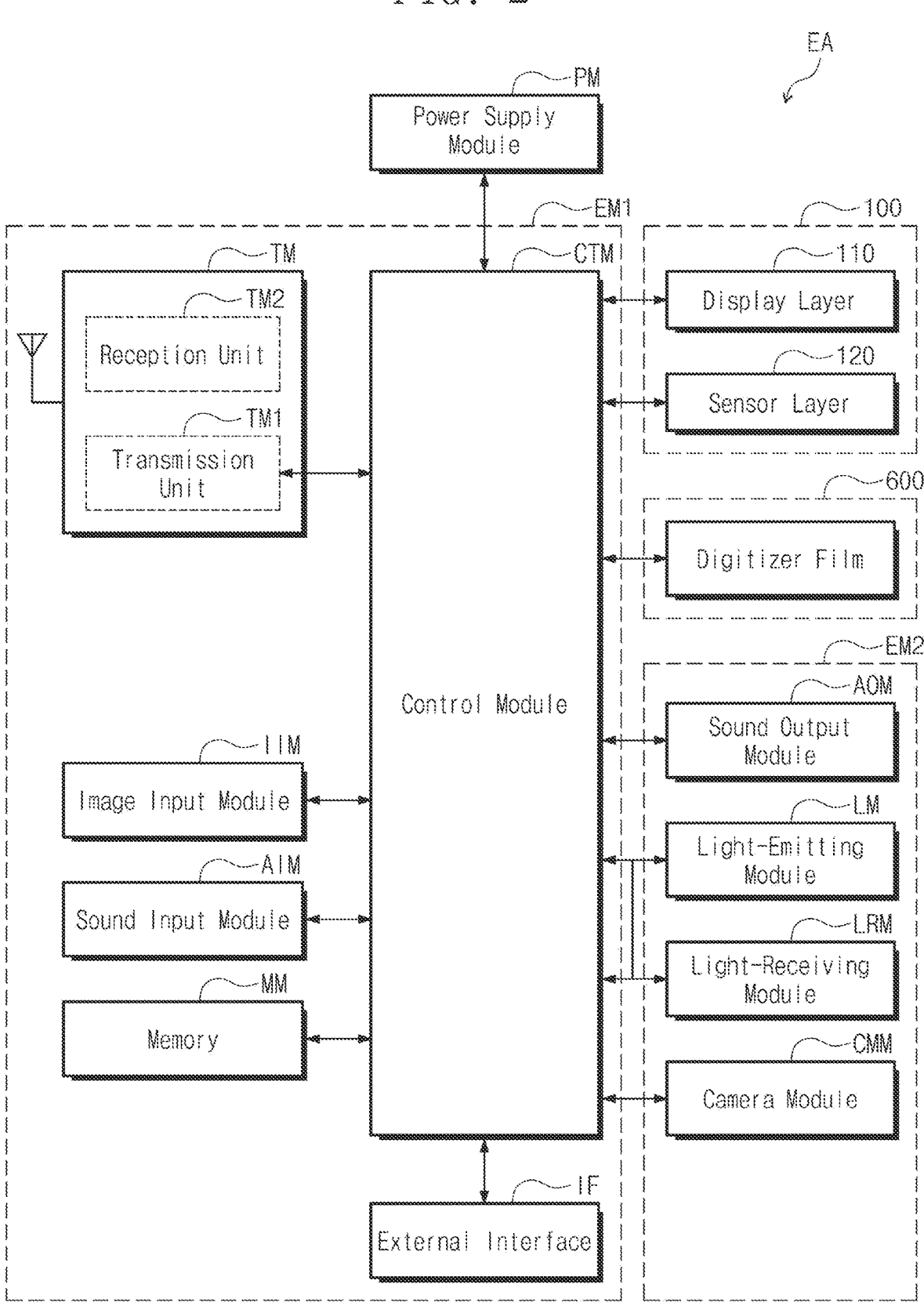
FIG. 2 is a block diagram of a display device according to an embodiment of the present disclosure.

FIG. 2 is a block diagram of a display device EA according to an embodiment of the present disclosure.

Referring to FIG. 2, the display device EA, according to an embodiment of the present disclosure, may include a display module 100, a power supply module PM, a first electronic module EM1, and a second electronic module EM2. The display module 100, a digitizer film 600, the power supply module PM, the first electronic module EM1, and the second electronic module EM2 may be electrically connected.

The display module 100 may include a display layer 110 and a sensor layer 120. The display layer 110 may be a component that substantially generates an image. The image generated by the display layer 110 may be viewed to a user at the outside through the first display surface FS (see, e.g., FIG. 1A).

The first electronic module EM1 and the second electronic module EM2 may each include various functional modules for driving the display device EA. The first electronic module EM1 may be directly mounted on a motherboard electrically connected to the display module 100 or may be mounted on a separated substrate and electrically connected to the motherboard through a connector.

The first electronic module EM1 may include a control module CTM, a wireless communication module TM, an image input module IIM, a sound input module AIM, a memory MM, and an external interface IF. Some of (or a part of) the above-mentioned modules may not be mounted on the motherboard and may be electrically connected to the motherboard through a flexible circuit board.

The control module CTM controls overall operation of the display device EA. The control module CTM may be a microprocessor. For example, the control module CTM may activate or deactivate the display module 100. The control module CTM may control other modules, such as the image input module IIM or the sound input module AIM on the basis of (e.g., according to) a touch signal received from the display module 100.

The wireless communication module TM may transmit/receive wireless signals to/from another terminal by using a Bluetooth® or a Wi-Fi® connection. The wireless communication module TM may transmit/receive electromagnetic signals by using a general communication line (or protocol). The wireless communication module TM may include a transmission unit TM1, which modulates signals to be transmitted, and a reception unit TM2, which demodulates received signals.

The image input module IIM may process image signals and convert the image signals into image data displayable on the display module 100. The sound input module AIM may receive external sound signals through a microphone in a recording mode and a voice recognition mode, etc. and may convert the sound signals to electrical voice data.

The external interface IF may act as an interface to be connected to an external charger, wired/wireless data ports, a card socket (e.g., a memory card, and a SIM/UIM card), and the like.

The second electronic module EM2 may include a sound output module AOM, a light-emitting module LM, a light-receiving module LRM, a camera module CMM, and the like. The above-mentioned components may be directly mounted on the motherboard or may be mounted on a separate substrate and electrically connected to the display module 100 through a connector, etc. or electrically connected to the first electronic module EM1.

The sound output module AOM may convert the electromagnetic data received from the wireless communication module TM or the sound data stored in the memory MM into voices and may output the voices to the outside.

The light-emitting module LM may generate light and output the light. For example, the light-emitting module LM may output infrared light. The light-emitting module LM may include an LED element. The light-receiving module LRM may detect infrared light. The light-receiving module LRM may be activated when infrared light of a reference (or predetermined) level or greater is detected. The light-receiving module LRM may include a CMOS sensor. The infrared light generated from the light-emitting module LM may be output and then reflected by an external object (e.g., a user's finger or face). The reflected infrared light may be incident on the light-receiving module LRM. The camera module CMM may capture external images.

Figure 4:
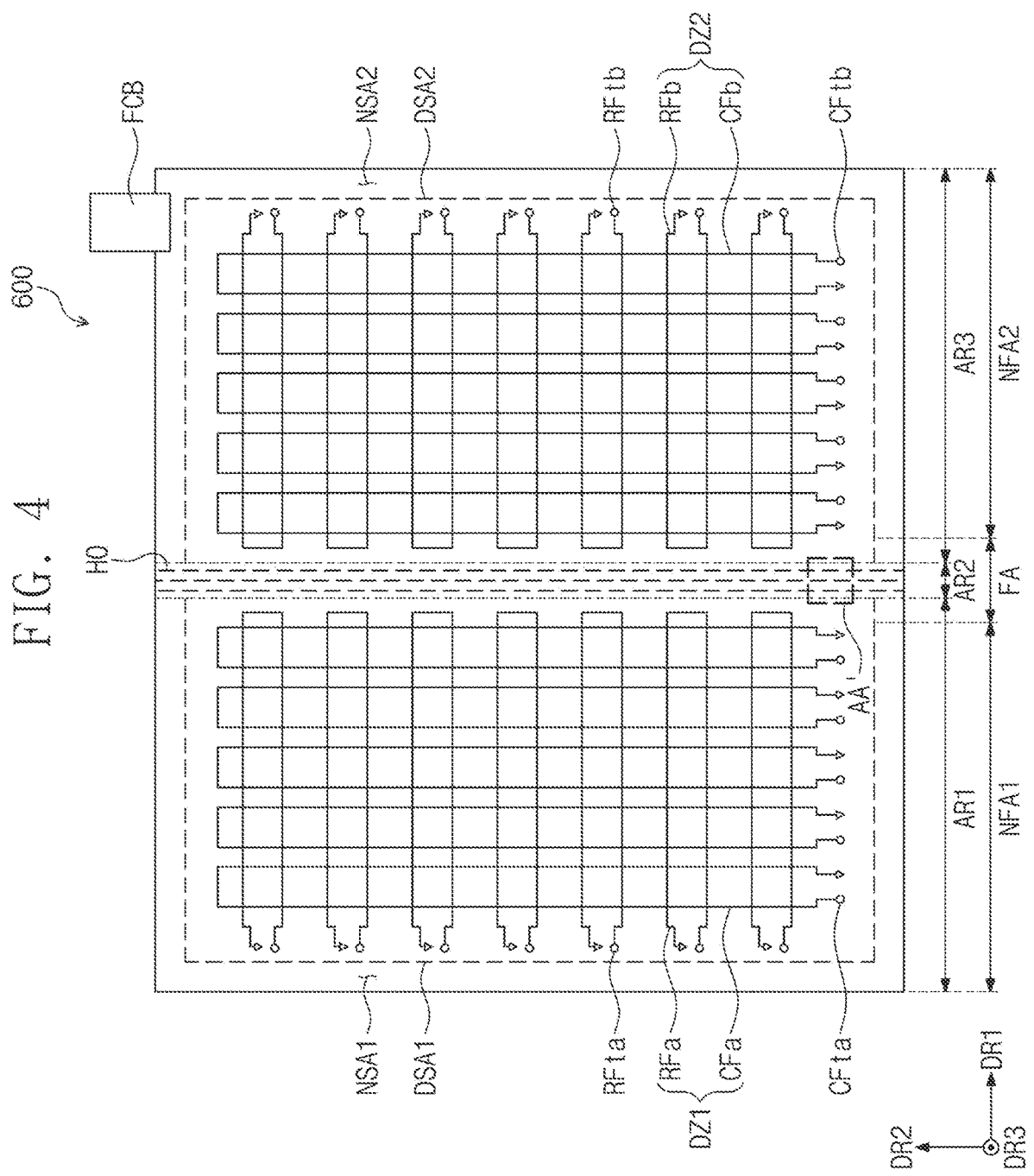
FIG. 4 is a plan view of a digitizer film according to an embodiment of the present disclosure.
Figure 5:
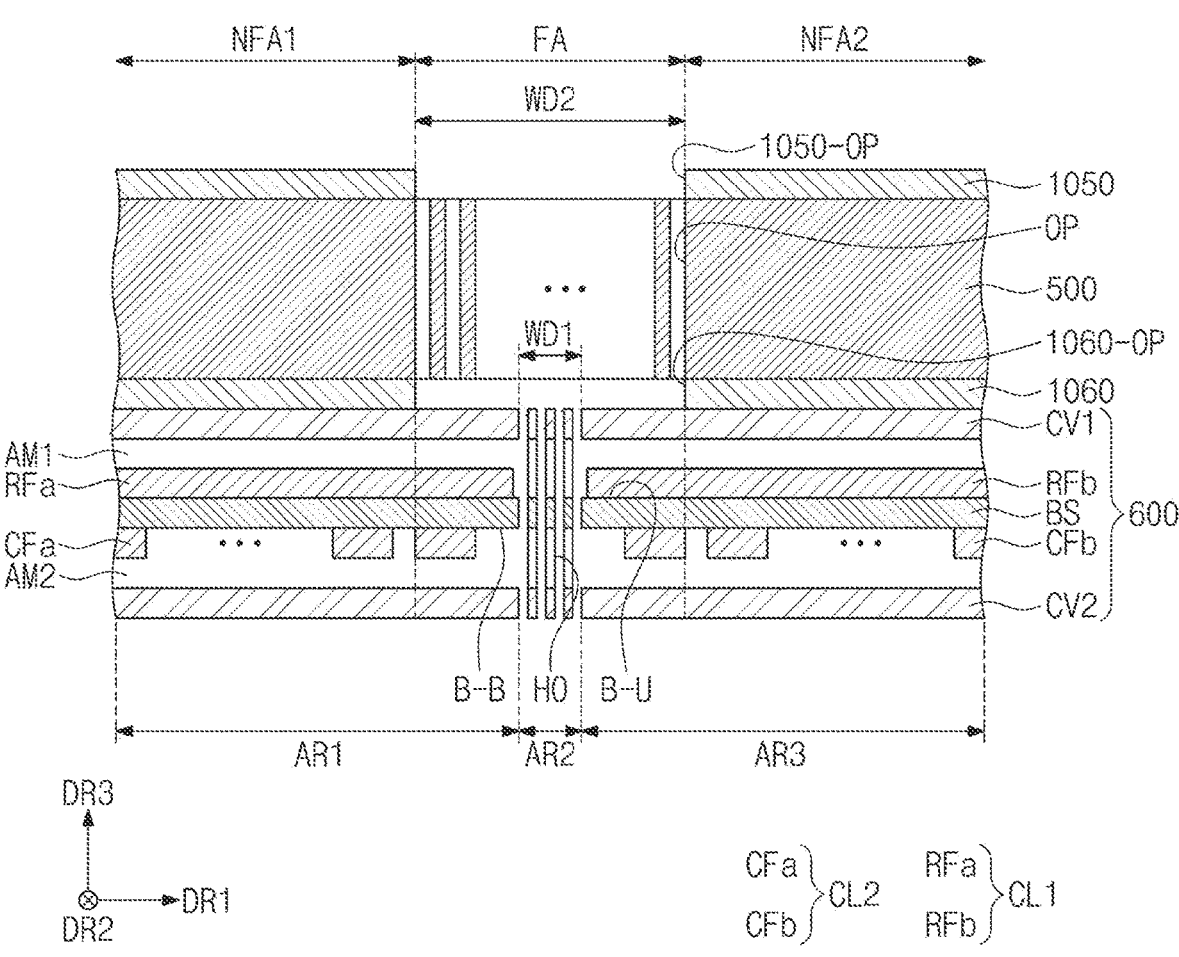
FIG. 5 is a cross-sectional view of a lower plate and a digitizer film according to an embodiment of the present disclosure.

The digitizer film 600 may include a plurality of coils RFa, CFa, RFb, and CFb (see, e.g., FIG. 4), a base layer BS (see, e.g., FIG. 5), and cover layers CV1 and CV2 (see, e.g., FIG. 5). The digitizer film 600 may detect external inputs by an electro-magnetic resonance (EMR) method. In the electro-magnetic resonance (EMR) method, a magnetic field (e.g., an oscillating magnetic field) may be generated by a resonance circuit configured inside the pen SP (see, e.g., FIG. 1A), the oscillating magnetic field may induce signals in the plurality of coils included in the digitizer film 600. Thus, the position of the pen SP may be detected by the signals induced in the coils. The digitizer film 600 will be described in more detail later.

Figure 3:
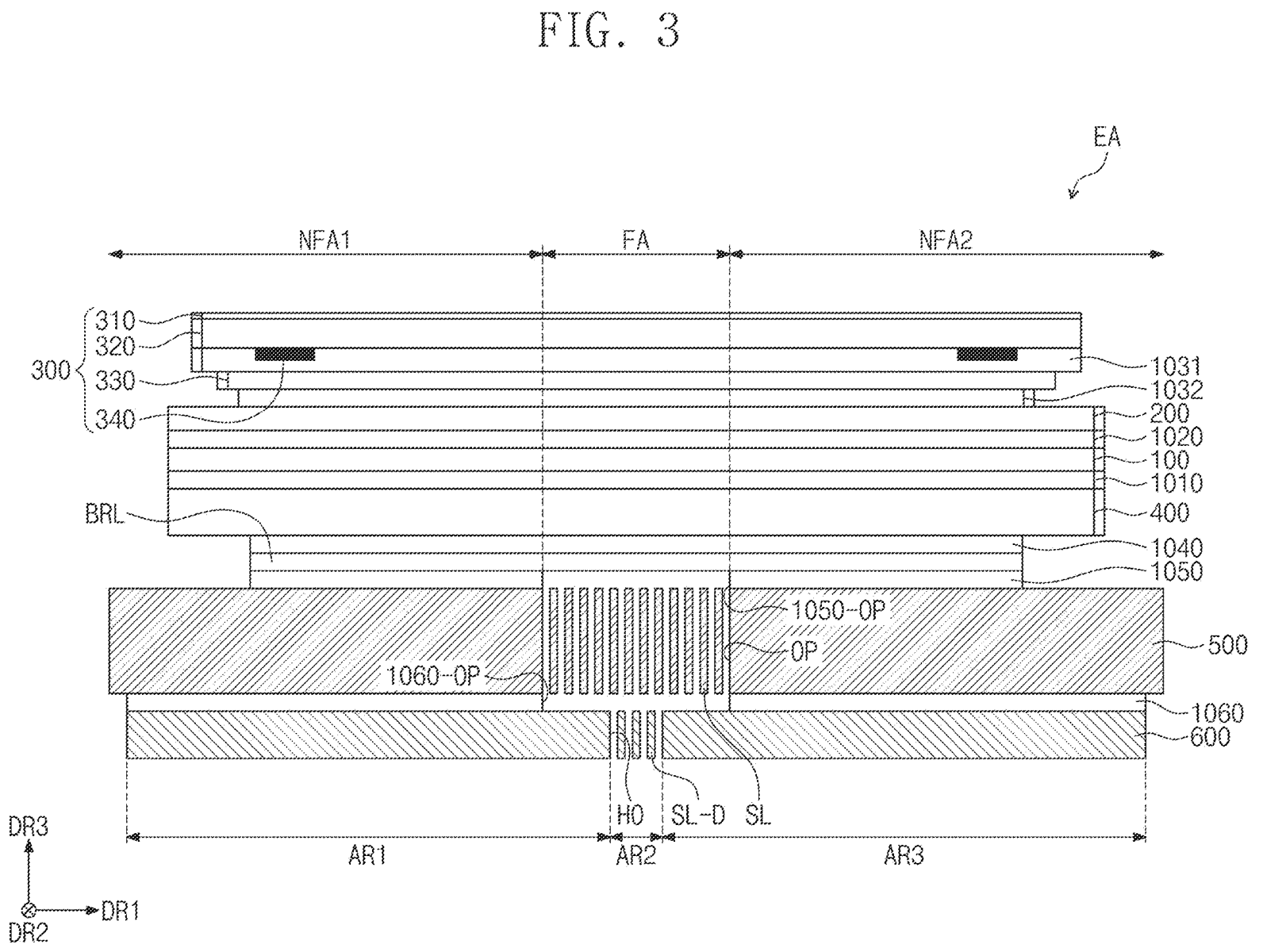

FIG. 3 is a cross-sectional view of the display device EA according to an embodiment of the present disclosure.

Referring to FIG. 3, the display device EA may include a window module 300, an optical film 200, a display module 100, a panel protective layer 400, a barrier layer BRL, a lower plate 500, and a digitizer film 600. In addition, the display device EA may further include adhesive layers 1031, 1032, 1020, 1010, 1040, 1050, and 1060 that bond the respective components.

The adhesive layers 1031, 1032, 1020, 1010, 1040, 1050, and 1060, to be described in more detail below, may each be transparent adhesive layers including any one from among a pressure sensitive adhesive (PSA) film, an optically clear adhesive (OCA) film, and an optically clear resin (OCR). In various embodiments, at least one of the adhesive layers 1031, 1032, 1020, 1010, 1040, 1050, or 1060 may be omitted.

The window module 300 may be disposed on the display module 100. The window module 300 may be coupled to a housing to define the exterior of the display device EA and may protect the display module 100. The window module 300 may include a glass substrate 330, a window protective layer 320, and a light-blocking pattern 340.

The glass substrate 330 may include a material having high light-transmittance. The glass substrate 330 may be a chemically strengthened glass. The glass substrate 330 may reduce or minimize the occurrence of wrinkles even when the folding and unfolding operations are repeated.

The window protective layer 320 may be disposed on the glass substrate 330. The window protective layer 320 and the glass substrate 330 may be bonded to each other by the adhesive layer 1031. The window protective layer 320 may include a plastic film. For example, the window protective layer 320 may include at least one of polyimide, polycarbonate, polyamide, tri-acetyl cellulose, polymethylmethacrylate, or polyethylene terephthalate.

The light-blocking pattern 340 may be disposed on a lower surface of the window protective layer 320. The light-blocking pattern 340 may be disposed on one surface of the window protective layer 320 facing the glass substrate 330. The adhesive layer 1031 may cover the light-blocking pattern 340, but an embodiment of the present disclosure is not limited thereto.

The light-blocking pattern 340, which is a colored light-blocking film, may be formed, for example, by a coating method. The light-blocking pattern 340 may include a base material and a dye or pigment mixed with the base material. Therefore, a user may recognize a first peripheral region F-NAA of the display device EA due to the color of the light-blocking pattern 340. That is, the light-blocking pattern 340 may overlap the first peripheral region F-NAA illustrated in FIG. 1A.

FIG. 3 illustrates that the light-blocking pattern 340 is disposed on an inner portion of the window protective layer 320 at a distance from the end (or edge) of the window protective layer 320. However, an embodiment of the present disclosure is not limited thereto, and the light-blocking pattern 340 may be disposed under the window protective layer 320 and aligned with (or extending to) the end (or edge) of the window protective layer 320.

In addition, FIG. 3 illustrates an embodiment in which the light-blocking pattern 340 is disposed on the lower surface of the window protective layer 320, but an embodiment of the present disclosure is not limited thereto. For example, the light-blocking pattern 340 may be disposed on the upper surface of the window protective layer 320 or may be disposed on either of the upper surface or the lower surface of the glass substrate 330.

The window module 300 may further include a hard coating layer 310. The hard coating layer 310 may be disposed on the window protective layer 320 to be disposed at the outermost layer of the window module 300. The hard coating layer 310, which is a functional layer for improving use characteristics of the display device EA, may be provided by coating the window protective layer 320. For example, the hard coating layer 310 may improve anti-fingerprint, anti-contamination, anti-reflective, and anti-scratch characteristics.

The optical film 200 may be disposed under the window module 300. The optical film 200 and the window module 300 may be bonded to each other by the adhesive layer 1032. The optical film 200 may reduce external light reflectance of the display module 100 due to light incident on the display module 100. The optical film 200 may further include at least one of an anti-reflective film, a polarizing film, a color filter, or a gray filter.

The display module 100 may be disposed under the optical film 200. The display module 100 and the optical film 200 may be bonded to each other by the adhesive layer 1020. The display module 100 may have, as an output device, a function of displaying images, and may have, as an input device, a function of detecting inputs applied from the outside. For example, the display module 100 may include the display layer 110 and the sensor layer 120 described above with reference to FIG. 2. The display layer 110 may be a component that substantially generates images. The display layer 110 may be any one from among an organic light-emitting display panel, a quantum-dot display panel, and an inorganic light-emitting display panel, but is not limited particularly thereto.

The panel protective layer 400 may be disposed under the display module 100. The panel protective layer 400 and the display module 100 may be bonded to each other by the adhesive layer 1010. The panel protective layer 400 may protect the display module 100. For example, the panel protective layer 400 may reduce stress applied to the display module 100 when the display device EA is folded. In addition, the panel protective layer 400 may prevent external moisture from permeating the display module 100 and may absorb external impacts.

The panel protective layer 400 may include a flexible plastic material. For example, the panel protective layer 400 may include polyethylene terephthalate.

The panel protective layer 400 is illustrated as overlapping the folding region FA and the first and second non-folding regions NFA1 and NFA2. However, an embodiment of the present disclosure is not limited thereto, and the panel protective layer 400 may include two protective layers that do not overlap (e.g., that are spaced apart at) the folding region FA while respectively overlapping the first and the second non-folding regions NFA1 and NFA2.

The barrier layer BRL may be disposed under the panel protective layer 400. The barrier layer BRL and the panel protective layer 400 may be bonded to each other by the adhesive layer 1040. The barrier layer BRL may increase resistance to the compressive force caused by external pressure. Accordingly, the barrier layer BRL may prevent deformation (e.g., unintentional deformation) of the display module 100.

The barrier layer BRL may include a flexible plastic material, such as polyimide or polyethylene terephthalate. In addition, the barrier layer BRL may be a colored film having low light transmittance. The barrier layer BRL may absorb light incident from the outside. For example, the barrier layer BRL may be a black synthetic resin film. When viewing the display device EA from above the window protective layer 320, the components disposed under the barrier layer BRL may be invisible to (e.g., may not be visible to) a user. However, an embodiment of the present disclosure is not limited thereto, and the barrier layer BRL may be omitted from the display device EA according to an embodiment of the present disclosure.

The lower plate 500 may be disposed under the display module 100. The lower plate 500 may support the components disposed above the lower plate 500 and may maintain an unfolded state and a folded state of the display module 100. In addition, the lower plate 500 may improve the heat dissipation characteristics of the display device EA.

A plurality of plate openings OP may be defined in a region of the lower plate 500 overlapping the folding region FA. The plurality of plate openings OP may be formed to pass through the lower plate 500 from the front surface to the rear surface thereof. Portions between the plurality of plate openings OP in the folding region FA may each have a slit SL structure. The slit SL structure may have a mutually connected shape, such as a mesh.

According to an embodiment of the present disclosure, when the display device EA is in-folded with respect to the first folding axis AX1 (see, e.g., FIG. 1B), the area of each of the plurality of plate openings OP between the slits SL may increase or decrease along the folding direction. When the display device EA is unfolded, the plurality of plate openings OP may return to their original shape. Accordingly, the lower plate 500 has the plurality of plate openings OP formed in the region overlapping the folding region FA such that it may be more easily deformed when the display device EA is folded.

The lower plate 500 may include any one from among stainless steel, titanium, and a reinforced fiber composite. The reinforced fiber composite may be a carbon fiber reinforced plastic (CFRP) or a glass fiber reinforced plastic (GFRP).

The barrier layer BRL and the lower plate 500 may be bonded to each other by the adhesive layer 1050. The adhesive layer 1050, according to an embodiment, may have a first portion overlapping the first non-folding region NFA1 and a second portion overlapping the second non-folding region NFA2. The first portion and the second portion may not overlap the folding region FA and may be disposed along a first direction DR1 while having with a separation space 1050-OP therebetween. Therefore, the adhesive layer 1050 may not overlap the plurality of plate openings OP of the lower plate 500. Accordingly, when the lower plate 500 is folded, the slits SL may be easily deformed without interference by the adhesive layer 1050.

The digitizer film 600 may be disposed under the lower plate 500. The digitizer film 600 may detect the signals transmitted by the pen SP (see, e.g., FIG. 1A) from among external inputs.

The digitizer film 600 may have a first region AR1, a second region AR2, and a third region AR3 defined therein along the first direction DR1. The first region AR1 may overlap the first non-folding region NFA1 and a portion of the folding region FA. The second region AR2 may overlap a portion of the folding region FA. The third region AR3 may overlap a portion of the folding region FA and the second non-folding region NFA2.

A plurality of holes (or openings) HO passing through the digitizer film 600 may be defined in the second region AR2 of the digitizer film 600. The plurality of holes HO may be formed to pass through the digitizer film 600 from the front surface to the rear surface thereof. The plurality of holes HO may have a slit structure SL-D in the second region AR2. The slit structure SL-D may be a mutually connected shape, such as a mesh.

The adhesive layer 1060 may be disposed between the lower plate 500 and the digitizer film 600 and may bond the lower plate 500 and the digitizer film 600 together. The adhesive layer 1060 may overlap the first non-folding region NFA1 and the second non-folding region NFA2 and may not overlap the folding region FA such that the plurality of plate openings OP are exposed. For example, the adhesive layer 1060 may be disposed along the first direction DR1 while having a separation space 1060-OP. Therefore, the adhesive layer 1060 may not overlap the plurality of plate openings OP in the lower plate 500. Accordingly, when the lower plate 500 is folded, the slits SL may be easily deformed without interference by the adhesive layer 1060.

FIG. 4 is a plan view of the digitizer film 600 according to an embodiment of the present disclosure.

Referring to FIG. 4, the digitizer film 600 may include a first digitizer DZ1 and a second digitizer DZ2. The first digitizer DZ1 may be disposed in a first region AR1, and the second digitizer DZ2 may be disposed in a third region AR3. That is, the first digitizer DZ1 and the second digitizer DZ2 may be spaced apart from each other with a second region AR2 therebetween.

The digitizer film 600 may include a plurality of coils RFa, CFa, RFb, and CFb not overlapping (e.g., offset from) the second region AR2. The plurality of coils RFa, CFa, RFb, and CFb may include a plurality of first coils RFa, a plurality of second coils CFa, a plurality of third coils RFb, and a plurality of fourth coils CFb.

The first region AR1 of the digitizer film 600 may include a first detection region DSA1 and a first non-detection region NSA1 surrounding at least a portion of the first detection region DSA1. The first detection region DSA1 may be a region to be detected by the first digitizer DZ1. In the present disclosure, the first detection region DSA1 may overlap at least a portion of the folding region FA.

The first digitizer DZ1 may include the plurality of first coils RFa and the plurality of second coils CFa. The plurality of first coils RFa and the plurality of second coils CFa may be disposed in the first region AR1. The plurality of first coils RFa may be referred to as sensing coils, and the plurality of second coils CFa may be referred to as driving coils, but an embodiment of the present disclosure is not limited thereto. For example, the plurality of first coils RFa may be driving coils, and the plurality of second coils CFa may be sensing coils.

Each of the plurality of first coils RFa may have long sides and a short side. The long sides of the plurality of first coils RFa may each extend along the first direction DR1 and may be spaced apart from each other along the second direction DR2. The short side may be connected to respective ends of the long sides, thereby connecting the long sides which are spaced apart from each other. Accordingly, each of the plurality of first coils RFa may form a loop.

The long sides and the short side of each of the plurality of first coils RFa may be disposed on the same layer, but an embodiment of the present disclosure is not limited thereto. For example, the long sides and the short side may be disposed on different layers. In addition, FIG. 4 illustrates an embodiment in which the plurality of first coils RFa, each of which forms a loop, are spaced apart from each other, but an embodiment of the present disclosure is not limited thereto. For example, the long sides of in the coils adjacent to each other from among the plurality of first coils RFa may be arranged alternately with each other.

Each of the plurality of second coils CFa may have long sides and a short side. The long sides of the plurality of second coils CFa may each extend along the second direction DR2 and may be spaced apart from each other along the first direction DR1. The short side may be connected to respective ends of the long sides, thereby connecting the long sides which are spaced apart from each other. Accordingly, each of the plurality of second coils CFa may form a loop.

The long sides and the short side of each of the plurality of second coils CFa may be disposed on the same layer, but an embodiment of the present disclosure is not limited thereto. For example, the long sides and the short side may be disposed on different layers. In addition, FIG. 4 illustrates an embodiment in which the plurality of second coils CFa, each of which forms one loop, are spaced apart from each other, but an embodiment of the present disclosure is not limited thereto. For example, the long sides included in the coils adjacent to each other from among the plurality of second coils CFa may be arranged alternately with each other.

AC signals may be sequentially provided to second terminals CFta of the plurality of second coils CFa. Terminals differing from the second terminals CFta of the plurality of second coils CFa (e.g., of each of the plurality of second coils CFa) may be grounded. Respective signal lines may be connected to the second terminals CFta of the plurality of second coils CFa. Such signal lines may be disposed in the first non-detection region NSA1.

Terminals differing from the first terminals RFta of the plurality of first coils RFa (e.g., of each of the plurality of first coils RFa) may be grounded. Respective signal lines may be connected to the first terminals RFta of the plurality of first coils RFa. Such signal lines may be disposed in the first non-detection region NSA1.

When current flows through the plurality of second coils CFa, magnetic fields may be induced between the plurality of first coils RFa and the plurality of second coils CFa. The plurality of first coils RFa may detect an induced force released from the pen SP (see, e.g., FIG. 1A) and may output the electromagnetic force, as a detection signal, to the first terminals RFta of the plurality of first coils RFa.

The third region AR3 of the digitizer film 600 may include a second detection region DSA2 and a second non-detection region NSA2 surrounding at least a portion of the second detection region DSA2. The second detection region DSA2 may be a region that is detected by the second digitizer DZ2. In an embodiment, the second detection region DSA2 may overlap at least a portion of the folding region FA.

The second digitizer DZ2 may include the plurality of third coils RFb and the plurality of fourth coils CFb. The plurality of third coils RFb and the plurality of fourth coils CFb may be disposed in the third region AR3. The plurality of third coils RFb may be referred to as sensing coils, and the plurality of fourth coils CFb may be referred to as driving coils, but an embodiment of the present disclosure is not limited thereto. For example, the plurality of third coils RFb may be driving coils, and the plurality of fourth coils CFb may be sensing coils.

Each of the plurality of third coils RFb may have long sides and a short side. The long sides of the plurality of third coils RFb may each extend along the first direction DR1 and may be spaced apart from each other along the second direction DR2. The short side may be connected to respective ends of the long sides, thereby connecting the long sides which are spaced apart from each other. Accordingly, each of the plurality of third coils RFb may form a loop.

The long sides and the short side of each of the plurality of third coils RFb may be disposed on the same layer, but an embodiment of the present disclosure is not limited thereto. For example, the long sides and the short side may be disposed on different layers. In addition, FIG. 4 illustrates an embodiment in which the plurality of third coils RFb, each of which forms one loop, may be spaced apart from each other, but an embodiment of the present disclosure is not limited thereto. For example, the long sides included in the coils adjacent to each other from among the plurality of third coils RFb may be arranged alternately with each other.

Each of the plurality of fourth coils CFb may have long sides and a short side. The long sides of the plurality of fourth coils CFb may each extend along the second direction DR2 and may be spaced apart from each other along the first direction DR1. The short side may be connected to respective ends of the long sides, thereby connecting the long sides which are spaced apart from each other. Accordingly, each of the plurality of fourth coils CFb may form a loop.

The long sides and the short side of each of the plurality of fourth coils CFb may be disposed on the same layer, but an embodiment of the present disclosure is not limited thereto. For example, the long sides and the short side may be disposed on different layers. In addition, FIG. 4 illustrates an embodiment in which the plurality of fourth coils CFb, each of which forms one loop, may be spaced apart from each other, but an embodiment of the present disclosure is not limited thereto. For example, the long sides included in the coils adjacent to each other from among the plurality of fourth coils CFb may be arranged alternately with each other.

Operations of the plurality of third coils RFb and the plurality of fourth coils CFb may be substantially same as operations of the plurality of first coils RFa and the plurality of second coils CFa. The plurality of first coils RFa and the plurality of second coils CFa may be electrically separated from the plurality of third coils RFb and the plurality of fourth coils CFb.

The plurality of coils RFa, CFa, RFb, and CFb may not be disposed in the second region AR2 of the digitizer film 600. Accordingly, the second region AR2 may be a region in which an input by the pen SP (see, e.g., FIG. 1A) is not detectable. According to an embodiment of the present disclosure, the width of the second region AR2 in the first direction DR1 may be smaller than the width of the folding region FA in the first direction DR1. Therefore, the digitizer film 600, according to an embodiment of the present disclosure, may detect the input by the pen SP even in the folding region FA.

The plurality of holes HO passing through the digitizer film 600 may be defined in the second region AR2 of the digitizer film 600. The plurality of holes HO may extend along the second direction DR2 and may be spaced apart from each other in the first direction DR1 and the second direction DR2. The plurality of holes HO may be arranged in a plurality of rows. The plurality of holes HO are described in more detail later with reference to FIG. 6.

A flexible circuit film FCB may be connected to the third region AR3 of the digitizer film 600 at where the second digitizer DZ2 is disposed. An external flexible circuit film may be further provided to electrically connect the first digitizer DZ1 to the flexible circuit film FCB. For example, the external flexible circuit film may electrically connect a conductive layer disposed in the first region AR1 to a conductive layer disposed in the second region AR2. For example, because the conductive layer disposed in the first region AR1 and the conductive layer disposed in the second region AR2 are electrically separated in the digitizer film 600, the conductive layers may be electrically connected to each other through an additional component, for example, through the external flexible circuit film. Signals provided from the flexible circuit film FCB may be transmitted to the first digitizer DZ1 through the external flexible circuit film, and signals generated from the first digitizer DZ1 may be transmitted to the flexible circuit film FCB through the external flexible circuit film.

However, this is an example, and the arrangement of the flexible circuit film FCB is not limited thereto. For example, a plurality of flexible circuit films may be connected respectively to the first and second digitizers DZ1 and DZ2. In such an embodiment, the plurality of flexible circuit films may be connected to the same digitizer film 600, and the first digitizer DZ1 and the second digitizer DZ2 may operate separately.

FIG. 5 is a cross-sectional view of the lower plate 500 and the digitizer film 600 according to an embodiment of the present disclosure.

Referring to FIG. 5, the digitizer film 600 may include the base layer BS, a first conductive layer CL1, and a second conductive layer CL2. In the digitizer film 600, the first region AR1, the second region AR2, and the third region AR3 may be defined along the first direction DR1. The first region AR1 may overlap a first non-folding region NFA1 and a portion of a folding region FA. The second region AR2 may overlap a portion of the folding region FA. The third region AR3 may overlap a portion of the folding region FA and a second non-folding region NFA2.

The second region AR2 may be a region in which a plurality of coils RFa, CFa, RFb, and CFb are not disposed. A width WD1 of the second region AR2 in the first direction DR1 may be smaller than a width WD2 of the folding region FA in the first direction DR1. For example, the width WD2 of the folding region FA may be in a range of about 5 mm to about 50 mm, and the width WD1 of the second region AR2 may be in a range of about 0.5 mm to about 4 mm.

If the width WD1 of the second region AR2 is less than about 5 mm, cracks may occur on the digitizer film 600 when the display device EA is folded. If the width WD1 of the second region AR2 is more than about 4 mm, the region in which external inputs (e.g., the pen SP) are not detectable may increase in the display device EA, thereby inconveniencing the user of the display device EA. Therefore, the width WD1 of the second region AR2 is in a range of about 0.5 mm to about 4 mm.

The base layer BS may have an upper surface B-U and a lower surface B-B facing the upper surface B-U. The base layer BS may include synthetic rubber and a cross-linkable composition. However, this is an example, and the material of the base layer BS is not limited thereto.

The first conductive layer CL1 may include, from among the plurality of coils RFa, CFa, RFb, and CFb, the plurality of coils RFa and RFb disposed on the upper surface B-U of the base layer BS. For example, the first conductive layer CL1 may include the plurality of first coils RFa and the plurality of third coils RFb. The second conductive layer CL2 may include, from among the plurality of coils RFa, CFa, RFb, and CFb, the plurality of coils CFa and CFb disposed on the lower surface B-B of the base layer BS. For example, the second conductive layer CL2 may include the plurality of second coils CFa and the plurality of fourth coils CFb. The first conductive layer CL1 and the second conductive layer CL2 may not overlap the second region AR2. However, an embodiment of the present disclosure is not limited thereto, and the configuration of the plurality of coils RFa, CFa, RFb, and CFb included in the first conductive layer CL1 and the second conductive layer CL2 may be changed. For example, the first conductive layer CL1 may include the plurality of first coils RFa and the plurality of fourth coils CFb, and the second conductive layer CL2 may include the plurality of second coils CFa and the plurality of third coils RFb.

The plurality of first coils RFa may be disposed in the first region AR1, and the plurality of third coils RFb may be disposed in the third region AR3. Because the plurality of first coils RFa and the plurality of third coils RFb are not disposed in the second region AR2, the plurality of first coils RFa and the plurality of third coils RFb may be spaced apart from each other. For example, the plurality of first coils RFa and the plurality of third coils RFb may be electrically disconnected.

The plurality of second coils CFa may be disposed in the first region AR1, and the plurality of fourth coils CFb may be disposed in the third region AR3. Because the plurality of second coils CFa and the plurality of fourth coils CFb are not disposed in the second region AR2, the plurality of second coils CFa and the plurality of fourth coils CFb may be spaced apart from each other. For example, the plurality of second coils CFa and the plurality of fourth coils CFb may be electrically disconnected.

The digitizer film 600 may further include a first adhesive layer AM1 and a second adhesive layer AM2. The first adhesive layer AM1 may be disposed on the upper surface B-U of the base layer BS and may cover the first conductive layer CL1. The first adhesive layer AM1 may bond a first cover layer CV1 and the base layer BS together. The first adhesive layer AM1 may cover the coils RFa and RFb from among the plurality of coils RFa, CFa, RFb, and CFb. For example, the first adhesive layer AM1 may cover the plurality of first coils RFa and the plurality of third coils RFb. The second adhesive layer AM2 may be disposed on the lower surface B-B of the base layer BS and may cover the second conductive layer CL2. The second adhesive layer AM2 may bond a second cover layer CV2 and the base layer BS together. The second adhesive layer AM2 may cover the remaining coils CFa and CFb from among the plurality of coils RFa, CFa, RFb, and CFb. For example, the second adhesive layer AM2 may cover the plurality of second coils CFa and the plurality of fourth coils CFb.

The digitizer film 600 may further include the first cover layer CV1 attached to the first adhesive layer AM1 and the second cover layer CV2 attached to the second adhesive layer AM2. The first cover layer CV1 and the second cover layer CV2 may include polyimide.

Figure 6:
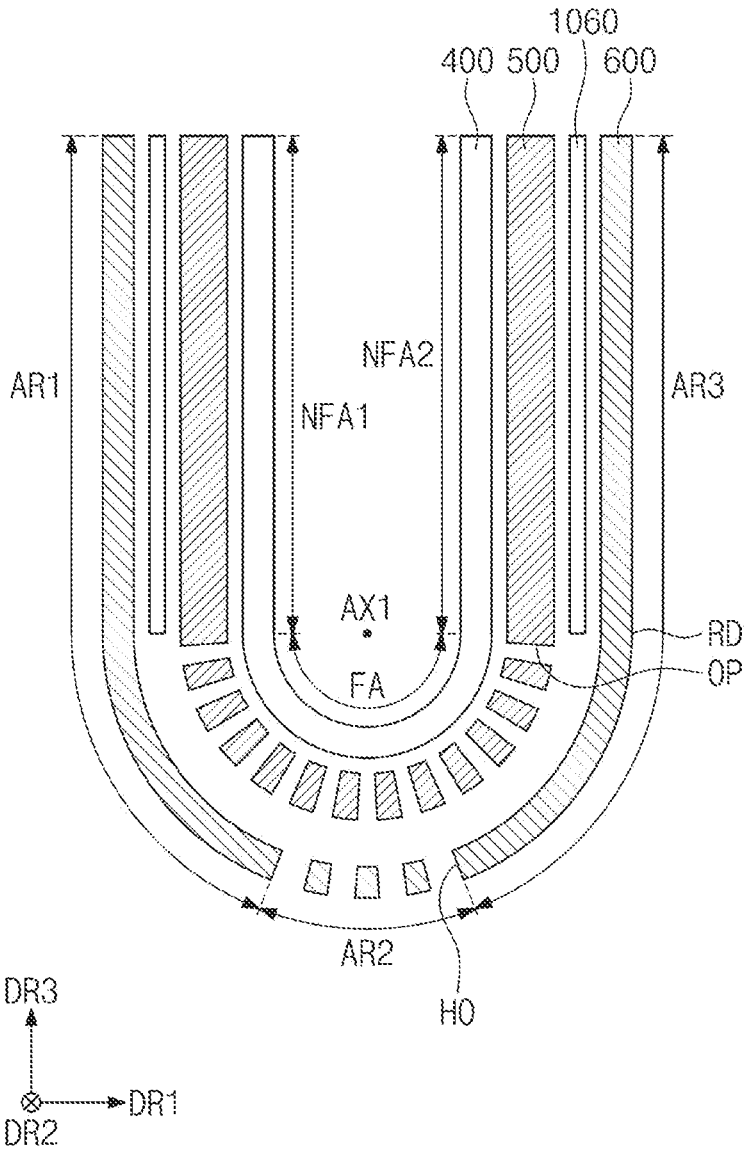
FIG. 6 is a cross-sectional view illustrating a portion of a folded display device according to an embodiment of the present disclosure.

FIG. 6 is a cross-sectional view partially illustrating the display device EA shown in FIG. 1A in the folded state according to an embodiment of the present disclosure. FIG. 6 illustrates the panel protective layer 400, the lower plate 500, and the digitizer film 600.

Referring to FIGS. 5 and 6, when the display device EA (see, e.g., FIG. 1A) is folded, the area of a plurality of plate openings OP may increase or decrease according to the folding direction. For example, when the display device EA is in-folded with respect to a first folding axis AX1, the area of some portions of the plurality of plate openings OP adjacent to the digitizer film 600 may increase, and the area of other portions of the plurality of plate openings OP adjacent to the panel protective layer 400 may decrease. Because the plurality of plate openings OP are formed in a region of the lower plate 500 overlapping the folding region FA, the lower plate 500 may be easily deformed when the display device EA is folded.

Similarly, when the display device EA is folded, the area of the plurality of holes HO defined in the digitizer film 600 may increase or decrease according to the folding direction. For example, when the display device EA is in-folded with respect to the first folding axis AX1, the area of some portions of the plurality of holes HO adjacent to the lower plate 500 may decrease, and other portions of the plurality of holes HO adjacent to a second display surface RD may increase.

The first cover layer CV1, the base layer BS, and the second cover layer CV2 of the digitizer film 600 may be physically connected across first through third regions AR1, AR2, and AR3, and the plurality of holes HO may be formed in the second region AR2. Therefore, stress generated during folding of the display device EA and applied to the digitizer film 600 may be reduced. Because the stress is reduced, tearing of the digitizer film 600 may be prevented. For example, in this embodiment, the tearing of the base layer BS may be less likely to occur or may not occur compared to cases where only the base layer BS overlaps the folding region FA, and the components, such as the first cover layer CV1, the first adhesive layer AM1, the second adhesive layer AM2, and the second cover layer CV2, are spaced apart from each other in the folding region FA.

Because the material for the base layer BS is not limited, the base layer may not include an elastic material. Therefore, the manufacturing cost of the digitizer film 600 may be reduced and the difficulty of the manufacturing process may be reduced. In addition, a folding operation may be more easily performed in this embodiment than in cases where a plurality of holes HO are not formed in the digitizer film 600.

In addition, because the plurality of coils RFa, CFa, RFb, and CFb are not disposed in the second region AR2 overlapping the folding region FA of the display module 100, a crack may not occur or the probability of cracking may be reduced in the plurality of coils RFa, CFa, RFb, and CFb even when the display device EA repeats folding and unfolding operations.

Figure 7:
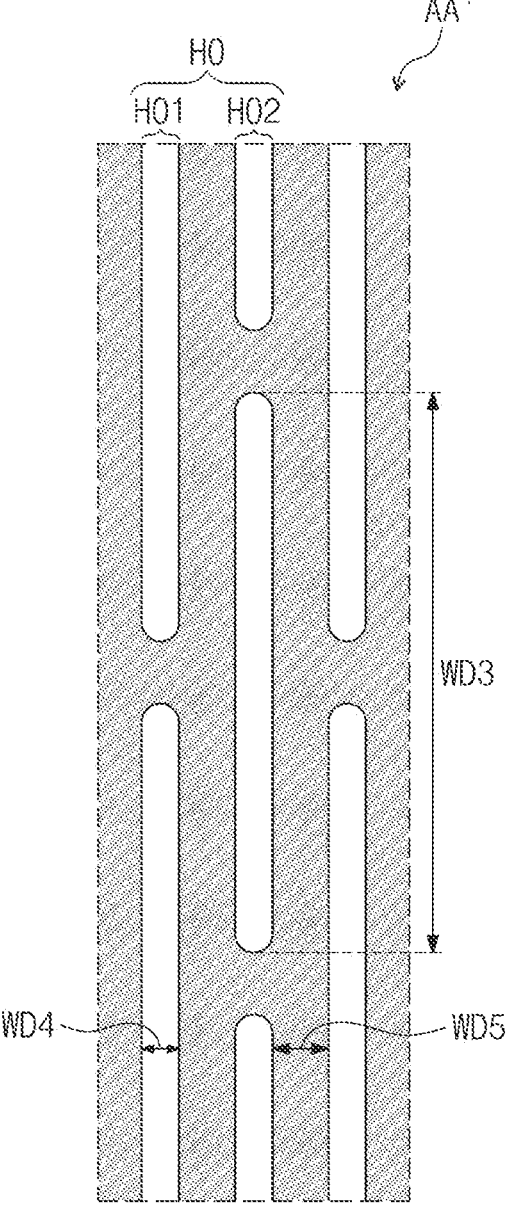
FIG. 7 is an enlarged view of the region AA' in FIG. 4.
Figure 7:
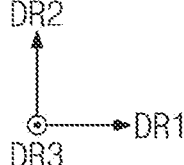

FIG. 7 is an enlarged view of the region AA' in FIG. 4.

Referring to FIGS. 5 and 7, the plurality of holes HO may be defined in the digitizer film 600. The plurality of holes HO may be formed to pass through the first cover layer CV1, the first adhesive layer AM1, the base layer BS, the second adhesive layer AM2, and the second cover layer CV2.

The plurality of holes HO may extend along the second direction DR2. The plurality of holes HO may include a first hole group HO1 and a second hole group HO2, which are spaced apart from each other in a first direction DR1, and the first hole group HO1 and the second hole group HO2 may be arranged in a staggered manner. For example, the center of a hole from among the second hole group HO2 may not overlap the center of a hole from among the first hole group HO1 in the first direction DR1. For example, the center of a hole from among the second hole group HO2 may be equidistant to the center of two adjacent holes from among the first hole group HO1 in the second direction DR2.

In an unfolded state, if a length WD3 of each of the plurality of holes HO in the second direction DR2 is less than about 10 mm, the display device EA may not be easily foldable. For example, if the length WD3 of each of the plurality of holes HO is less than about 10 mm, more tensile stress may be applied to the digitizer film 600 when the digitizer film 600 is stretched. If the length WD3 of each of the plurality of holes HO in the second direction DR2 is more than about 50 mm, the second region AR2 that connects the first region AR1 and the third region AR3 may sag. Therefore, in an unfolded state, the length WD3 of each of the plurality of holes HO in the second direction DR2 is in a range of about 10 mm to about 50 mm.

In an unfolded state, if a width WD4 of each of the plurality of holes HO in the first direction DR1 is less than about 20 μm, the digitizer film 600 may not be easily stretched when the display device EA is folded. If the width WD4 of each of the plurality of holes HO in the first direction DR1 is more than about 300 μm, the second region AR2 of the digitizer film 600 may not withstand the tensile force and may be torn when the display device EA is folded. Therefore, in an unfolded state, the width WD4 of each of the plurality of holes HO in the first direction DR1 is in a range of about 20 μm to about 300 μm.

In an unfolded state, if a distance WD5 between the first hole group HO1 and the second hole group HO2 is less than about 50 μm, the second region AR2 of the digitizer film 600 may not withstand the tensile force and may be torn when the display device EA is folded. If the distance WD5 between the first hole group HO1 and the second hole group HO2 is more than about 300 μm, the digitizer film 600 may not be easily stretched when the display device EA is folded. Therefore, in an unfolded state, the distance WD5 between the first hole group HO1 and the second hole group HO2 is in a range of about 50 μm to about 300 μm.

FIG. 7 illustrates three hole groups, but the number of hole groups is not limited thereto. For example, the number of hole groups formed in the second region AR2 may be 2 or less or may be 4 or more.

According to the foregoing, a first cover layer, a base layer, and a second cover layer of a digitizer film may be physically connected across first through third regions, and a plurality of holes may be formed in the second region. Therefore, stress generated during folding of a display device and applied to the digitizer film may be reduced. Because the stress is reduced, the digitizer film may not be torn.

Because the material for the base layer is not limited, the base layer may not include an elastic material. Therefore, the manufacturing cost of the digitizer film and the difficulty of the manufacturing process may be reduced.

Moreover, because a plurality of coils are not disposed in the second region overlapping a folding region of a display module, a crack may not occur or the probability of cracking may be reduced in the plurality of coils even when the display device is repeatedly folded and unfolded.

Although embodiments of the present disclosure have been described, it is understood that the present disclosure should not be limited to these embodiments and that various changes and modifications can be made by one ordinary skilled in the art within the spirit and scope of the present disclosure. Therefore, the technical scope of the present disclosure should not be limited to the contents described in the detailed description of the specification but is defined by the claims and their equivalents.

What is claimed is:

1. A display device comprising:
   a display module having a first non-folding region, a folding region foldable with respect to a folding axis, and a second non-folding region sequentially arranged along a first direction;
   a lower plate under the display module and having a plurality of plate openings overlapping the folding region; and
   a digitizer film under the lower plate and having a first region overlapping the first non-folding region and a portion of the folding region, a second region overlapping the folding region, and a third region overlapping a portion of the folding region and the second non-folding region, wherein the digitizer film has a plurality of holes passing therethrough in the second region, wherein the digitizer film comprises a plurality of coils not overlapping the second region, wherein the plurality of holes extend along a second direction crossing the first direction, wherein the plurality of holes comprise a first hole group and a second hole group spaced apart from each other in the first direction, wherein the first hole group and the second hole group are arranged in a staggered manner, and wherein a distance between the first hole group and the second hole group is in a range of 50 μm to 300 μm in a non-folding state.

2. The display device of claim 1, wherein the plurality of coils comprise:

a plurality of first coils in the first region and extending along the first direction;

a plurality of second coils in the first region and extending along a second direction crossing the first direction;

a plurality of third coils in the third region and extending along the first direction; and a plurality of fourth coils in the third region and extending along the second direction, and wherein the plurality of first coils and the plurality of second coils are electrically separated from the plurality of third coils and the plurality of fourth coils.

3. The display device of claim 1, wherein the digitizer film further comprises:

a base layer having an upper surface and a lower surface facing the upper surface;

a first conductive layer comprising a part of the plurality of coils on the upper surface of the base layer; and a second conductive layer comprising a remaining part of the plurality of coils on the lower surface of the base layer, and wherein the first conductive layer and the second conductive layer do not overlap the second region.

4. The display device of claim 3, wherein the digitizer film further comprises a first adhesive layer on the upper surface of the base layer and covering the first conductive layer, and wherein the first adhesive layer covers the part of the plurality of coils.

5. The display device of claim 4, wherein the digitizer film further comprises a second adhesive layer on the lower surface of the base layer and covering the second conductive layer, and wherein the second adhesive layer covers the remaining part of the plurality of coils.

6. The display device of claim 5, wherein the digitizer film further comprises a first cover layer attached to the first adhesive layer and a second cover layer attached to the second adhesive layer, wherein the plurality of holes pass through the first cover layer, the first adhesive layer, the base layer, the second adhesive layer, and the second cover layer.

7. The display device of claim 1, wherein the second region has a width smaller than that of the folding region.

8. The display device of claim 7, wherein the width of the second region is in a range of 0.5 mm to 4 mm.

9. The display device of claim 1, wherein a length of each of the plurality of holes in the second direction is in a range of 10 mm to 50 mm in a non-folding state.

10. The display device of claim 1, wherein a width of each of the plurality of holes in the first direction is in a range of 20 μm to 300 μm in a non-folding state.

11. The display device of claim 1, further comprising an adhesive layer between the lower plate and the digitizer film and overlapping the first non-folding region and the second non-folding region, and wherein the adhesive layer does not overlap the folding region to expose the plurality of plate openings.

12. The display device of claim 1, wherein the folding region has a width in a range of 5 mm to 50 mm.

13. A display device comprising:

a display module having a first non-folding region, a folding region foldable with respect to a folding axis, and a second non-folding region sequentially arranged along a first direction;

a lower plate under the display module and having plate openings overlapping the folding region defined therein; and a digitizer film under the lower plate and having a first region overlapping the first non-folding region and a portion of the folding region, a second region overlapping the folding region, and a third region overlapping a portion of the folding region and the second non-folding region, wherein the digitizer film has a plurality of holes passing therethrough in the second region, wherein the second region of the digitizer film has a width smaller than that of the folding region, and wherein a length of each of the plurality of holes in the second direction is in a range of 10 mm to 50 mm in a non-folding state.

14. The display device of claim 13, wherein the digitizer film comprises:

a plurality of first coils in the first region and extending along the first direction;

a plurality of second coils in the first region and extending along a second direction crossing the first direction;

a plurality of third coils in the third region and extending along the first direction; and a plurality of fourth coils in the third region and extending along the second direction, and wherein the plurality of first coils and the plurality of second coils are electrically separated from the plurality of third coils and the plurality of fourth coils.

15. The display device of claim 13, wherein the plurality of holes extend along a second direction crossing the first direction, wherein the plurality of holes comprise a first hole group and a second hole group spaced apart from each other in the first direction, and wherein the first hole group and the second hole group are arranged in a staggered manner.

16. The display device of claim 15, wherein a distance between the first hole group and the second hole group is in a range of 50 μm to 300 μm in a non-folding state.

17. The display device of claim 15, wherein a width of each of the plurality of holes in the first direction is in a range of 20 μm to 300 μm in a non-folding state.

* * * * *